United States Patent [19]

Cox et al.

[11] Patent Number: 4,767,670

[45] Date of Patent: Aug. 30, 1988

[54] CHROMATOGRAPHIC SUPPORTS FOR SEPARATION OF OLIGONUCLEOTIDES

[75] Inventors: Geoffrey B. Cox, Wilmington, Del.; Anthony Atkinson, Salisbury, United Kingdom; Peter A. D. Edwardson, Salisbury, United Kingdom; Michael D. Scawen, Salisbury, United Kingdom

[73] Assignee: E. I. Du Pont de Nemours and Company, Wilmington, Del.

[21] Appl. No.: 11,328

[22] Filed: Jan. 21, 1987

[51] Int. Cl.$^4$ .................. B32B 9/00; B01D 15/08; B01J 20/00

[52] U.S. Cl. .................. 428/403; 428/405; 428/406; 428/407; 210/656; 210/679; 502/401; 502/407; 502/41$^5$

[58] Field of Search .................. 428/4$^-$ 210/656, 660, 679; 502/401–404, 4

[56] References Cited

U.S. PATENT DOCUMENTS 4,029,583  6/1977  Ho Chang et al. .............. 502/404 X
4,340,496  7/1982  Abbott .......................... 210/656 X
4,600,646  7/1986  Stout ........................... 428/404 X

OTHER PUBLICATIONS

H. R. Matthews [Eur. J. Biochem., vol. 7, 96 (1968)].
T. F. Gabriel and J. E. Michalewsky [J. Chromatogr., vol. 80, 263 (1973)].
M. J. Gait and R. C. Sheppard, [Nucleic Acid Res., vol. 4, 1135 (1977)].
W. Haupt and A. Pingoud [J. Chromatogr., vol. 260, 419 (1983)].
M. V. Cubellis, et al., [J. Chromatogr., vol. 329, 406 (1985)].
L. W. McLaughlin, et al. [Anal. Biochem., vol. 112, 60 (1981)].
J. D. Pearson and F. E. Regnier, [J. Chromatogr., vol. 255, 137 (1983)].
R. R. Drager and F. E. Regnier [Anal. Biochem., vol. 145, 47 (1985)].
J. Visser and M. Strating [Biochem. Biophys. Acta., vol. 384, 69 (1975)].
G. C. Walker et al. [Proc. Nat. Acad. Sci. USA, vol. 72, 122 (1975)].
R. D. Wells, et al. [Meth. Enzymol., vol. 65, 327 (1980)].
R. Bischoff and L. W. McLaughlin [J. Chromatogr., vol. 270, 117 (1983)].
J. B. Crowther, et al. [J. Chromatogr., vol. 282, 619 (1983)].
R. Bischoff and L. McLaughlin [Anal. Biochem., vol. 151, 526 (1985)].
H-J Fritz, et al. [Biochemistry, vol. 17, 1257 (1978)].
A. M. Delort, et al., [J. Chromatogr., vol. 283, 462 (1984)].
J. M. Egly [J. Chromatogr., vol. 215, 243 (1981)].
W. Jost et al, "Application of Weakly Basic Dimethylamino–Modified Silica Ion Exchanger to the Separation of Oligonucleotides", J. Chromatogr. vol. 185 (1979), 403–412.

Primary Examiner—John E. Kittle
Assistant Examiner—Susan S. Rucker
Attorney, Agent, or Firm—Charles A. Weigel, Jr.

[57] ABSTRACT

A chromatographic packing useful for the separation of oligonucleotides is disclosed. The packing includes an insert porous support particle and a silane bonded phase comprising a weak anion exchange group in close proximity to at least one polar non-ionic group.

16 Claims; 10 Drawing Sheets

CHROMATOGRAPHIC SUPPORTS FOR SEPARATION OF OLIGONUCLEOTIDES

TECHNICAL FIELD

This invention relates to novel chromatographic supports useful for the separation and purification of oligonucleotides. Methods for the use of such supports and the manufacture of such supports are also disclosed.

BACKGROUND OF THE INVENTION

The synthesis and purification of single stranded oligonucleotides is of great importance to molecular biologists due to their uses as probes and their uses in recombinant DNA technology. The oligomers of greatest interest range in size from about 15 to 50 bases in length. With the improvements in the technology of oligonucleotide synthesis over the past few years, the need for rapid separations and purification of the synthetic oligonucleotides is becoming paramount.

Oligonucleotides were first separated by anion exchange chromatography on alkylammonium moieties bonded to polysaccharide based packing media as described by H. R. Matthews [Eur. J. Biochem., Vol. 7, 96 (1968)]. These methods had the disadvantage of being limited to relatively short chain oligonucleotides, having extremely long analysis times, and poor resolution of the individual oligomers. The large particle sizes used for the packing material contributed to these difficulties.

T. F. Gabriel and J. E. Michalewsky, [J. Chromatogr., Vol. 80, 263 (1973)] described the use of a pellicular ion exchange packing for the high performance ion exchange separation of oligonucleotides. This material allowed the separation in a shorter time, but only short chain oligonucleotides were investigated. M. J. Gait and R. C. Sheppard, [Nucleic Acid Res., Vol. 4, 1135 (1977)] reported the use of a microparticulate silica based strong anion exchanger which allowed the separation of deoxythymidyl oligomers up to seven bases in length within 20 minutes. This method still suffers from the inability to resolve longer oligonucleotides.

W. Haupt and A. Pingoud [J. Chromatogra., Vol. 260, 419 (1983)] used the same packing with a modified mobile phase to separate oligomers of deoxyadenosine and obtained a degree of resolution to oligomers of around 25 to 30 bases in length. The actual size of the individual oligonucleotides was poorly defined and baseline resolution was not achieved for oligomers more than approximately 15 bases long. These authors reported that the separations achieved by ion exchange chromatography were dependent upon the chain length of the oligonucleotide. No evidence of purity of the isolated materials was given.

The anion exchange chromatography of oligonucleotides on a polymer based strong anion exchange material was reported by M. V. Cubellis, et al. [J. Chromatogr., Vol. 329, 406 (1985)] for the separation of 15 to 18 base long oligonucleotides within 50 to 60 minutes. They report that at alkaline pH the separations became less influenced by the base sequency of the oligonucleotide.

W. Jost, et al. [J. Chromatogr. Vol. 185, p. 403 (1979)] reported the synthesis of a weak anion exchanger prepared from the reaction of N,N-dimethyl-2-hydroxyethylamine with glycidoxypropyl-substituted silica. They reported that the separation of oligonucleotides was related to their secondary structure. The isocratic separation of oligouridylic acids of up to 9 bases in length within 20 minutes was reported. This support still does not allow separation of longer chain oligonucleotides.

The use of an aminopropyl-silica weak anion exchanger for the separation of small heterooligonucleotides was reported by L. W. McLaughlin, et al. [Anal. Biochem., Vol. 112, 60 (1981)]. Retention was shown to be dependent on chain length and on the sequence and nature of the bases comprising the oligonucleotide. Oligonucleotides up to only 12 bases in length were separated in a time of 100 minutes.

Polyethyleneimine, crosslinked on silica gel, was used by J. D. Pearson and F. E. Regnier, [J. Chromatogr., Vol. 255, 137 (1983)] as a weak anion exchange material for the separation of oligoadenylic acids and oligothymidylic acids. Resolution of oligo(A) up to 17 bases and oligo(T) up to 15 bases was achieved in an isocratic mode in 80 and 60 minutes, respectively. This use of a slowly changing gradient profile allowed the separation of oligo(A) as high as 35-mer, albeit over 5 hours and with poorer resolution. No separations of hetero-oligomers were demonstrated.

Methylation of polyethyleneimine, crosslinked on silica (3 $\mu$m diameter) was reported by R. R. Drager and F. E. Regnier [Anal. Biochem., Vol. 145, 47 (1985)] to improve the separation of oligonucleotides. A gradient separation of oligo(A) in the 40 to 60 base range was reported. They also reported the chromatography of oligo(A) of up to 18 bases and oligo(T) up to 24 bases. In addition, the chromatography of two hetero-oligomers of 18 bases in length were reported. No independent data (such as gel electrophoresis) was given to assess the purity of the isolated components. The chromatography required 2 hours to achieve separation of the hetero-oligomers.

Mixed-mode chromatographic separations of multi-functional compounds have been known for some time. J. Visser and M. Strating [Biochem. Biophys. Acta., Vol. 384, 69 (1975)] reported the mixed mode separation of proteins on a stationary phase prepared from the reaction of aminohexanol with cyanogen bromide activiated Sepharose. This phase was noted to show results very similar to those from a similar phase prepared from propylamine. No separations of oligonucleotides was reported.

G. C. Walker, et al. [Proc. Nat. Acad. Sci. USA, Vol. 72, 122 (1975)] described the use of a quaternary ammonium salt coated on a Kel-F particle (designated as RPC-5) as a packing material for the separation of oligonucleotides. Typical operating conditions for this material were reported by R. D. Wells, et al. [Meth. Enzymol., Vol. 65, 327 (1980)]. These workers demonstrated the separation of oligodeoxyadenylic acid up to 40 base units long within 3 hours. The major disadvantage with this material was bleed of the quaternary ammonium phase, especially at low ionic strength.

Packings designed to exploit mixed mode separations for oligonucleotides were developed by R. Bischoff and L. W. McLauchlin [J. Chromatogr., Vol. 270, 117 (1983)]. They reacted organic aminoacids with aminopropyl silica to make phases with both weak anion exchange and reversed phase properties. These workers studied only oligomers up to 10 bases in length, the separation of which took 60 mintutes. This support allowed separation of oligonucleotides of the same chain length based upon base sequence.

J. B. Crowther, et al. [J. Chromatogr., Vol. 282, 619 (1983)] described an alternative approach in which they bonded two different silanes to silica, one a reversed phase C8, the other a chloropropylsilane which was subsequently converted to a strong anion exchange group by reaction with dimethylbenzylamine. This material allowed rapid separations, a 13 base oligouridylic acid was analyzed in 20 minutes, and a hetero-oligonucleotide 15 units long in 29 minutes. Again, the separation of long oligonucleotides was not reported.

In an attempt to mimic the RPC-5 packing (which is no longer commercially available), R. Bischoff and L. McLauchlin [Anal. Biochem., Vol. 151, 526 (1985)] coated on octadecylsilica with methyloctylammonium chloride. The separation of oligomers of deoxyuridylic acid up to 90 units in length over a period of 19 hours was shown, although baseline resolution was lost beyond components greater than 30 bases long which eluted in 12 hours. The main purpose of this work was to purify tRNA rather than the synthetic oligonucleotides. The major disadvantages of the material are the long analysis times and the potential of column bleed.

Other techniques of liquid chromatography have also been used for the purification of oligonucleotides. Reversed phase chromatography of both protected and unprotected oligonucleotides up to 12 base units in length was reported by H-J Fritz, et al. [Biochemistry, Vol. 17, 1257 (1978)]. No apparent correlation between chain length of oligoncleotide and retention was observed.

A. M. Delort, et al., [J. Chromatogr., Vol. 283, 462 (1984)] reported the separation of a variety of hetero-oligonucleotides up to 19 bases long by reversed phase chromatography. These analyses were rapid, being complete in less than 20 minutes but no correlation of retention time with chain length was seen.

Reversed phase ion-pair chromatography has been used for the separation of oligonucleotides. W. Haupt and A. Pingaud [J. Chromatogr., Vol. 260, p. 419 (1983)] have reported a gradient method for the analysis of oligonucleotides up to 16 bases long. The separation was related to chain length and was accomplished in about 45 minutes. The disadvantage of ion pair methods is that the ion pair reagent must be removed from the collected fractions. In addition, the resolution between homologues was shown to be less in ion pair than with ion exchange chromatography as larger oligonucleotides are separated.

Charge transfer chromatography of oligonucleotides using acriflavin bonded to agarose has been described by J. M. Egly [J. Chromatogr., Vol. 215, 243 (1981)]. This was used only for short chain compounds (up to 8-mer) and was very slow, typical separation times being on the order of 6 hours.

The enhancement of stability of bonded phase packings and silica to hydrolysis by buffers at pH values above 7 by introducing zirconium atoms into the silica structure has been disclosed by Stout (U.S. Pat. No. 4,600,646 issued July 15, 1986). Packings for the size exclusion chromatography of biopolymers were shown to have greater stability than similar materials which has not been so stabilized. No separations of oligonucleotides was reported.

It is thus apparent that a number of methods and materials are known for the separation of oligonucleotides, none of which meet all of the desirable criteria for separation and purification of oligonucleotides. Those desirable criteria are: rapid separation (generally less than 1 hour); separation based upon chain length resolution sufficient to allow recovery of substantially pure oligonucleotides; and being sufficiently stable to allow reproducible separations and preventing contamination of the product with released bonded phase. Most known separations are limited to small (up to 20 bases) oligonucleotides and require 1 to 2 hours.

The methods and materials which allow separation of longer oligonucleotides generally require very much longer analysis times and typically do not give good resolution between homologues. The need remains for a rapid separation of oligonucleotides in the 10 to 45-mer range which allows isolation of individual oligomers with high purity.

SUMMARY OF THE INVENTION

Many of the disadvantages inherent in the methods and materials for the separation of oligonucleotides are overcome by this invention which provides a chromatographic packing comprised of an inert porous support particle and a silane bonded phase comprising a weak anion exchange group in close proximity to at least two polar non-ionic group and has been found to be highly effective at separating oligonucleotides.

The method of separating oligonucleotides comprising chromatographing said oligonucleotides on a support comprised of a weak anion exchange group in close proximity to at least two polar non-ionic group.

Surprisingly, it has been found that oligonucleotides up to about 45 nucleotides in length can be purified to substantial homogeneity by HPLC on supports coated with a silane bonded phase comprised of a weak anion exchange group with at least one polar non-ionic group close to the anion exchange group. The most preferred HPLC packing is comprised of surface stabilized silica, as described by Stout (U.S. 4,600,646) and a silane of the structure:

The secondary amine group provides the necessary weak anion exchange group and at least two two hydroxyl groups provide the polar non-ionic groups. This silane is prepared by modification of the known γ-glycidoxypropyltrimethoxysilane with aminoethanol. The unique chromatographic packings of this invention are formed by bonding the modified silane to a support. When that support is silica the following structure is formed:

Methods of formulating the various chromatographic packings are also disclosed.

BRIEF DESCRIPTION OF THE DRAWINGS

The invention described herein would be better understood when considered in conjunction with the accompanying drawings in which.

DETAILED DESCRIPTION OF THE INVENTION

The unique chromatographic packings of this invention can be based upon many different support materials including silica, alumina and organic polymers such as crosslinked polystyrene-divinylbenzene resins. These supports should be inert and are preferably porous. The support should consist of small particles, preferably spherical with sizes ranging from about 2 μm to about 30 μm in diameter with about 3 to 6 μm being preferred. The particles should be stable to a range of organic solvents such as toluene, tetrahydrofuran, methanol, acetonitrile, acetone, N,N-dimethylformamide, and Freon ® fluorcarbons such as 1,1,2-trichloro-1,2,2-trifluoroethane. Silica supports are generally preferred, with the surface stabilized silica of Stout (U.S. Pat. No. 4,600,646) being most preferred. A commercially available silica suitable as a support is sold under the tradename Zorbax ® by E. I. du Pont de Nemours & Co., Inc. (Wilm., DE).

Silane bonded stationary phases constituting the packings of this invention comprise weak anion exchange groups in proximity to non-ionic polar groups and some hydrophobic regions. Those that are silane-based phases are generally prepared by modification of known silanes containing appropriate reactive groups to introduce the necessary interactive groups. These known silanes must be capable of reacting with the silica surface and the modifying reagents. The most preferred of these known reactive silanes is γ-glycidoxypropyltrimethoxysilane. This silane can be modified by reaction of the epoxide group with a suitable reagent. The modified silane is still capable of binding to the surface of the silica. Suitable modifying reagents have the general formula:

NH$_2$—(CH$_2$)n—OH where n is an integer between 2 and 4, inclusive. The resulting bonded phase has the structure where n is an integer between 2 and 4, inclusive. The reagent with n=2, 2-aminoethanol, is most preferred.

Other modifying reagents have the general formula:

where n=1-2 and X=alkyl or hydroxyalkyl. The resulting bonded phase has the structure where n=1-2 and X=alkyl or hydroxyalkly. For supports with more than one hydroxyl group in close proximity to the weak anion exchange group (in this case, a secondary amine) the interaction with the oligonucleotide is increased and the retention volume increased. Higher ionic strength solvents are required to elute the solutes from these types of columns.

Alternatively, the modified silane can be formed in situ on the surface of the support by first attaching the known reactive silane to the support then modifying the silane by reaction with the modifying reagent. Said modifying reagents are also commonly called ligands.

The more preferred method is to react the modifying reagent with the known reactive silane first, then bond the preformed modified silane to the support as described above. The latter process generally provides a higher yield of the desired support. When using the preferred known silane, the latter process also avoids the possibility that the epoxide ring will react with the support surface or traces of water, thereby diminishing its capacity to react with the modifying reagent. The reaction conditions required for production of the modified silane depend upon the particular reagents used, but will, in general, be readily apparent to the skilled artisan. The reaction of the preferred modifying reagent, 2-aminoethanol, and the preferred silane. γ-glycidoxypropyltrimethoxysilane, can be accomplished by refluxing them in a mixture of toluene and N,N-dimethylformamide (3:1 v/v) for about 2 hours. The preferred modified silane has the structure:

Again, the secondary amine provides the weak anion exchange group and the hydroxyls the polar non-ionic groups.

A systematic name for said preferred silane is
   3-[3'-(2''-Hydroxyethylamino)-2'-hydroxypropoxy]-propyltrimethoxysilane Other reaction sequences are known which can attach modifying reagents to silanes. One common approach is to use 4-nitrophenylchloroformate to activate a hydroxyl group. This approach can be used with the so-called diol supports resulting from hydrolysis of the epoxide of γ-glycidoxypropylsilica. Activation with 4-nitrophenylchloroformate followed by reaction with 2-aminoethanol leads to a packing with the following structure:

The carbamate linkage formed possesses only limited anion exchange characteristics, but nevertheless does provide the necessary functionality. The hydroxyls present provide the polar non-ionic groups. Retention of oligonucleotides by this packing is generally less than with those containing a secondary amino group. For that reason carbamate containing packings generally require lower ionic strength solvents.

These preformed modified silanes can be attached to the support under a variety of different conditions depending, in part, upon the nature of the support. When a silica support is used, the bonding can be done in aqueous or non-aqueous solvents. It is preferred to perform the bonding to the silica in the same solvent as used during the formation of the modified silane, this generally being an organic solvent. Mixtures of solvents can also be used, with a mixture of toluene and N,N-dimethylformamide being preferred. The preferred modified silane can be attached to a silica support by stirring in a mixture of refluxing toluene and N,N-dimethylformamide for about 16 hours. Modifications to this procedure will be readily apparent to the skilled artisan. The attachment of silanes to other supports is generally accomplished in a similar manner; however, compatibility of the support and solvent used must be taken into account. These procedures are generally known to the skilled artisan. Following preparation of the packing it is generally desirable to wash extensively with a series of solvents and then dry the packing before packing into a suitable chromatographic column. Column packing can be accomplished by any of the known methods.

The packings of this invention can be used for the separation of mixtures of polyfunctional compounds, particularly biomacromolecules and most particularly oligonucleotides. These separations can be accomplished either isocratically or by gradient elution. Gradients of pH, organic solvent or preferably ionic strength can be used. Other factors which affect the separation are the surface coverage of the bonded phase, the nature of any organic solvent used, temperature and the flow rate. Packings with silane surface coverage of less than about 0.9 μmole/m² gave poor separation while those with surface coverage greater than 1.5 μmole/m² gave uniformly good separation.

The mobile phase useful in the method of this invention can have a pH in the range from about 4.0 to about 8.5. The useful pH range will depend heavily upon the stability of the support material (i.e., silica, surface stabilized silica, alumina). A convenient pH range for most applications is between about 6.0 and about 7.0. Control of the pH is accomplished by use of an aqueous buffer. Generally, any buffer compatible with the solutes to be separated can be used, but phosphate buffer is preferred. It is normally desirable to include some amount of organic solvent in the mobile phase. In the range of about 5% to about 50% increasing organic solvent causes reduced retention of the solute on the column. A preferred mobile phase is approximately 20% acetonitrile (v/v) in 0.02M sodium phosphate buffer, pH approximately 7.0. Separation of oligonucleotides can be accomplished using such a buffer with a gradient of 0 to about 1M sodium chloride. Ambient temperatures are generally preferred for separation of oligonucleotides up to about 40 bases in length. Longer oligonucleotides or those with a strong tendency to form double stranded loops may require higher temperatures.

The mechanism by which separation is accomplished is not known with certainty; however, the following discussion is provided as an aid to understanding the method of this invention. Under the preferred separation conditions the secondary amine group present on the support is protonated and thus acts as a weak anion exchange group. During the separation of oligonucleotides, this weak anion exchange group is expected to interact with the phosphate groups which make up part of the backbone of said oligonucleotides. The hydrocarbon portion of the known silane portion of the packing provides some hydrophobic character to the packing. This portion of the packing can interact with the more hydrophobic portions of the oligonucleotide. These hydrophobic interactions are mitigated by the polar hydroxyl groups. The particular orientation of these hydroxyl groups adjacent to the secondary amino group may allow a specific interaction with portions of the oligonucleotide. It may be due to this particular orientation that the 2-aminoethanol modified γ-glycidoxylpropyltrimethoxysilane is the most preferred bonded phase.

As is demonstrated in Example 4 below, these amino ethanal based ligands 1-4, which contain a weak anion exchange group in close proximity to (within three backbone atoms) the polar non-ionic groups, allow good resolution of the oligonucleotides. The weak ion exchange group as set forth in the formulas above maybe either —(NH)— or The following examples aid the understanding of the packings and method of this invention.

EXAMPLE 1

Synthesis of [3(hydroxyethylamino)-2-hydroxyropoxy]propylsilylsilica

Toluene (150 mL) and N,N-dimethylformamide (50 mL) were heated to reflux under a Dean and Stark trap. 15 mL of condensate was removed from the trap. γ-Glycidoxypropyltrimethoxysilane (2 g) and 2-aminoethanol (0.5 g) were added sequentially and the mixture was heated under reflux for two hours. After cooling, 5 g of Zorbax ® silica (E. I. du Pont de Nemours & Co., Inc., Wilmington, DE), was added and the mixture was heated with stirring under reflux for 16 hours. The product was filtered, washed with 2×200 mL of tetrahydrofuran, resuspended in tetrahydrofuran (200 mL) and was heated to reflux with stirring for 5 minutes. The product was again filtered, washed with 2×200 mL of tetrahydrofuran and 2×200 mL of Freon ™ (1,1,2-trichloro-1,2,2-trifluoroethane) and dried.

EXAMPLE 2

Chromatographic Purification of Oligonucleotides

A. Column Preparation

The packing material produced in Example 1 was loaded into columns (25 cm×4.6 mm, 15 cm×4.6 mm, 5 cm×4.6 mm or 8 cm×6.2 mm) made from 316 stainless steel by standard slurry techniques.

B. Chromatographic Procedures

All chromatographic procedures were carried out at ambient temperature using either a Waters Associates HPLC system or an LKB GTi liquid chromatograph. Buffers used were: 20% acetonitrile in 0.02M potassium dihydrogen phosphate solution adjusted to pH 6.0 (Solvent A); 20% acetonitrile in 0.02M potassium dihydrogen phosphate containing 1M potassium chloride, adjusted to pH 6.0 (Solvent B); 20% acetonitrile in 0.02M sodium dihydrogen phosphate adjusted to pH 7.0 (Solvent C); and 20% acetonitrile in 0.02M sodium dihydrogen phosphate containing 1M sodium chloride adjusted to pH 7.0 (Solvent D).

The solvent gradients employed were:
(A) 0 to 100% Solvent B in Solvent A in 40 minutes, convex gradient curve, flow rate 1.0 mL/min.
(B) 15 to 75% Solvent D in Solvent C in 40 minutes, linear gradient, flow rate 1.0 mL/min.

C. Purification of Oligonucleotides

The following separations were accomplished using the procedures described in Example 2.B. The oligonucleotides were produced using an Applied Biosystems (Foster City, CA) Model 380 oligonucleotide synthesizer with methylphosphoramidite chemistry according to the manufacturer's instructions. Results are reported in FIGS. 1–6.

| | | |
|---|---|---|
| (1) | Oligonucleotide: AAAAAAAAAAAAAAA | |
| | (denoted by peak No. 1) | |
| | Column size: 5 cm × 4.6 mm | |
| | Gradient: A | |
| | FIG.: 1 | |
| (ii) | Oligonucleotide: CGTTTCTGGTCTCAGATTTT | |
| | (denoted by peak No. 1) | |
| | Column size: 25 cm × 4.6 mm | |
| | Gradient: B | |
| | FIG.: 2 | |
| (iii) | Oligonucleotide: AAATCGTCCCAGCACCGATCACC | |
| | (denoted by peak No. 1) | |
| | Column size: 5 cm × 4.6 mm | |
| | Gradient: A | |
| | FIG.: 3 | |
| (iv) | Oligonucleotide: GCGCCGTATCGTCAATCGTCCCC. | |
| | Column size: 5 cm × 4.6 mm | |
| | Gradient: A | |
| | FIG.: 4 | |
| (v) | Oligonucleotide: AAAGCGGAACTTCGCCGTATCT. | |
| | (denoted by peak No. 1) | |
| | Column size: 5 cm × 4.6 mm | |
| | Gradient: A | |
| | FIG.: 5 | |
| (vi) | Oligonucleotide: CTTCAACCAGCAGGTTAGCAGACTGAG | |
| | (denoted by peak No. 1) | |
| | Column size: 5 cm × 4.6 mm | |
| | Gradient: A | |
| | FIG.: 6 | |

D. Analysis of Purified Fractions

Peak fractions were collected from the major peaks of (iii) through (vi), desalted using a Sephadex G-25 gel permeation column and were freeze-dried. The resulting lyophilized powder was redissolved in 20 microliters of water and subjected to polyacrylamide gel electrophoresis according to the method of Frank et al. [Nucl. Acids Res., Vol. 9, 4967 (1981)]. Based upon the electropherograms, the oligonucleotides resulting from the chromatographic purification were greater than 90% pure.

EXAMPLE 3

Chromatographic Purification of Oligonucleotides

A. Column Preparation

The packing material produced in Example 1 was loaded into an 8 cm×6.2 mm stainless steel column using standard slurry techniques.

B. Chromatographic Procedures

Solvents A–D are as described in Example 2.B. Solvent E=0.02M potassium phosphate, 2.0M potassium chloride, 20% acetonitrile, pH 6.0. The solvent gradients used were:
(C) 0 to 100% Solvent B in Solvent A in 60 minutes, flow rate=0.5 mL/min.
(D) 0 to 100% Solvent E in Solvent A in 120 minutes, flow rate=0.5 mL/min.
(E) 35 to 60% Solvent D in Solvent C in 90 minutes, flow rate=1.0 mL/min.

C. Purification of Oligonucleotides

The following separations were accomplished using the procedures described in Example 3.B. The oligonucleotides were produced using an Applied Biosystems (Foster City, CA) Model 380 synthesizer with methylphosphoramidite chemistry according to the manufacturer's instructions. The results are reported in FIGS. 7–11.

| | | |
|---|---|---|
| (1) | Oligonucleotide: $dT_{24}$ and $DT_{25}$ | |
| | (denoted by peak numbers 1 and 2 respectively). | |
| | Gradient: E | |
| | FIG.: 7 | |
| (ii) | Oligonucleotide: $dT_3$ to $dT_{38}$ (denoted by peak numbers 3–38 respectively) from a failed synthesis of $dT_{40}$ | |
| | Gradient: E | |
| | FIG.: 8 | |
| (iii) | Oligonucleotide: GCGTACGCTCGAGATCTCCTTTGTCGA | |
| | (denoted by peak No. 1) | |
| | Gradient: C | |
| | FIG.: 9 | |
| iv | Oligonucleotide: GAACGCTTTCTACGAAATCCTGCATCTGCCGAACCTGAACGA | |
| | (denoted by peak No. 1) | |
| | Gradient: D | |
| | FIG.: 10 | |

Figure 1:
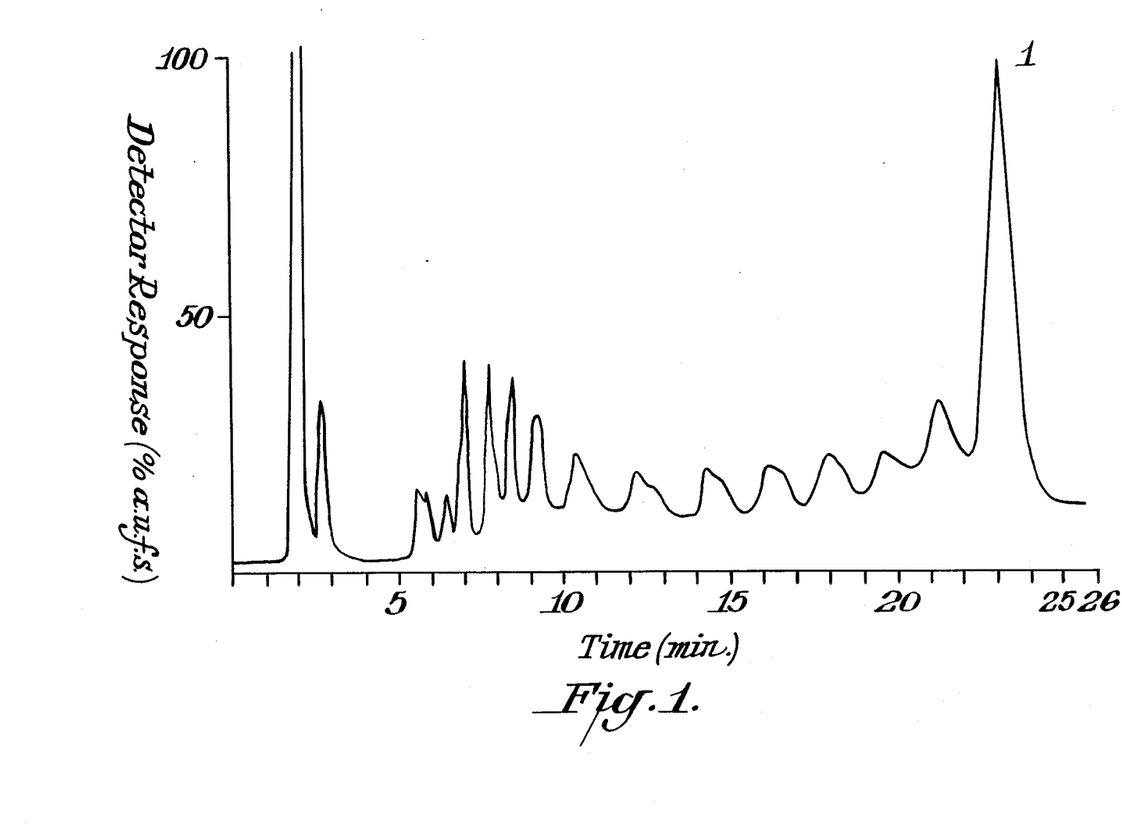
FIGS. 1-6 depict the separation of various oligonucleotides produced using an oligonucleotides synthesizer.
Figure 2:
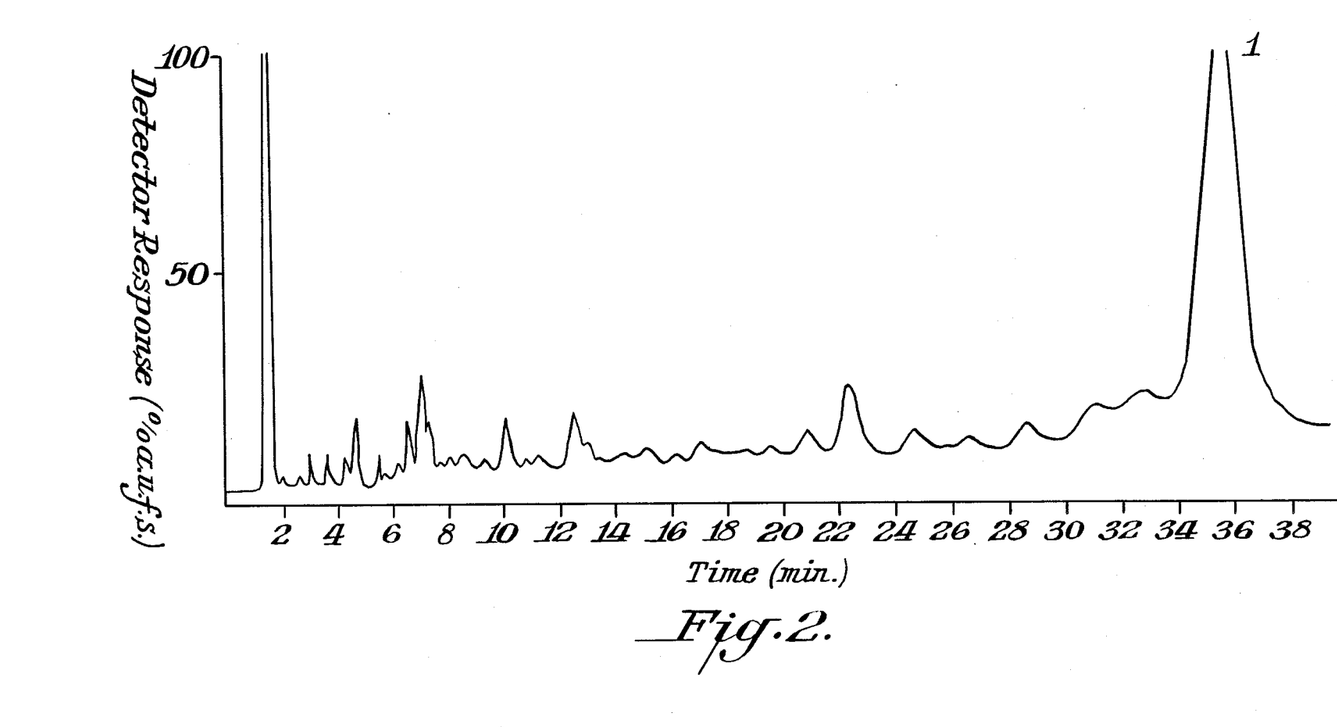
Figure 3:
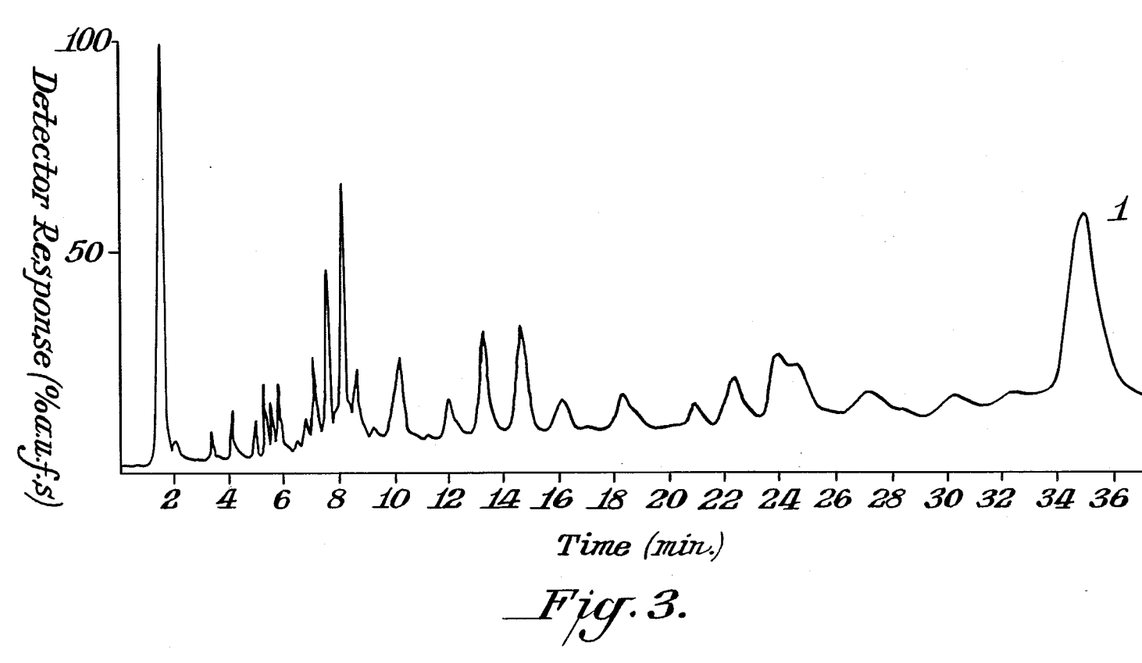
Figure 4:
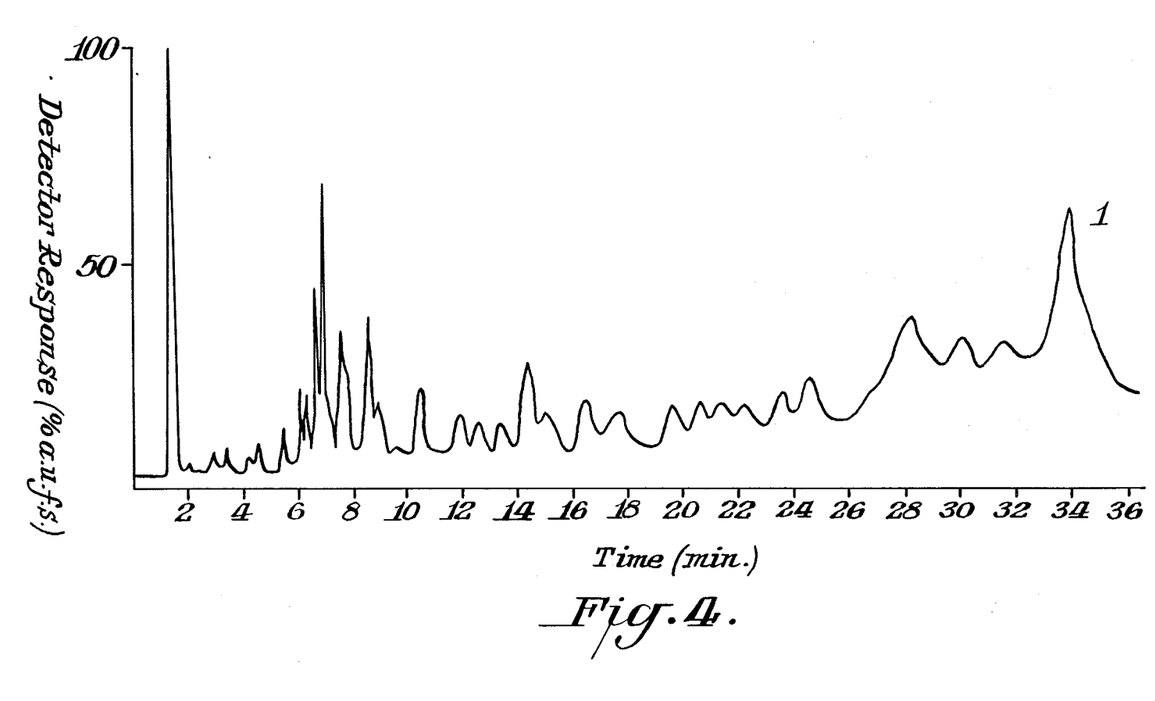
Figure 5:
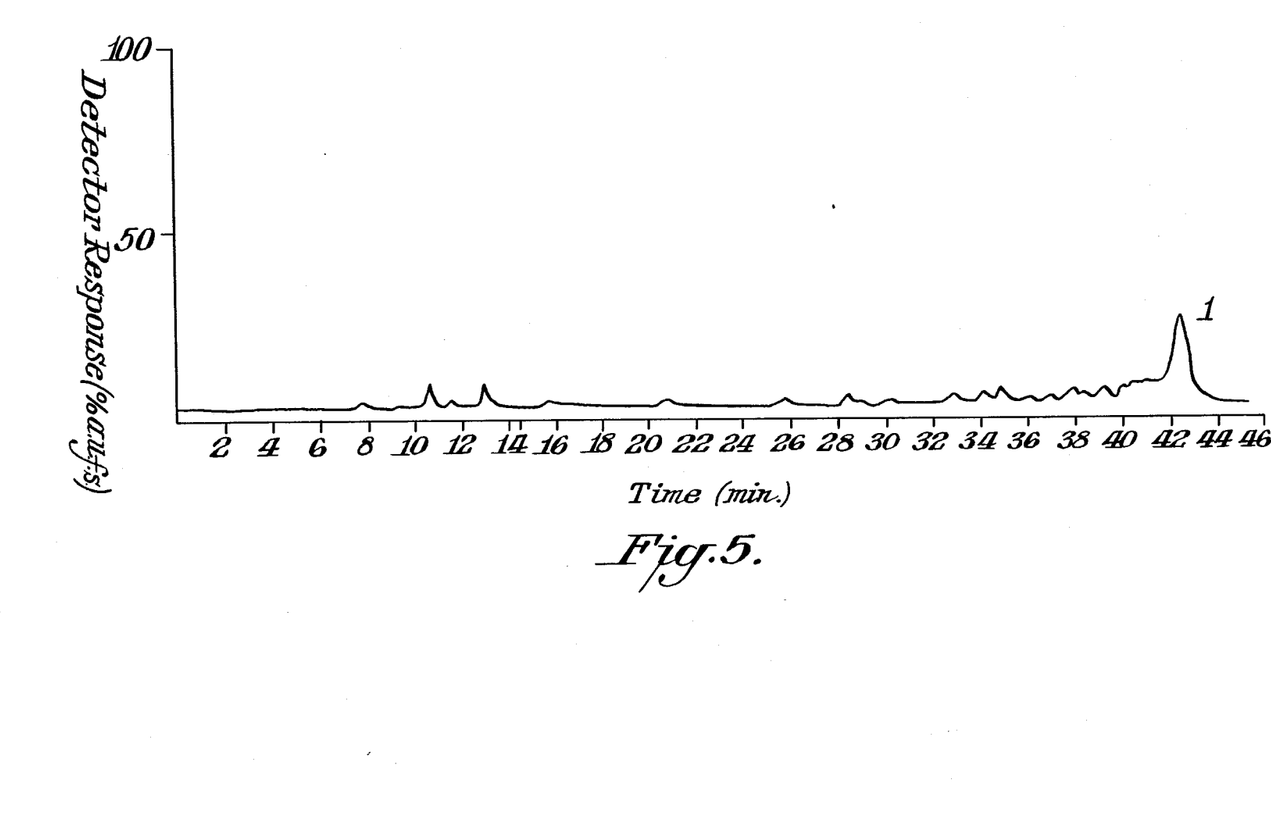
Figure 6:
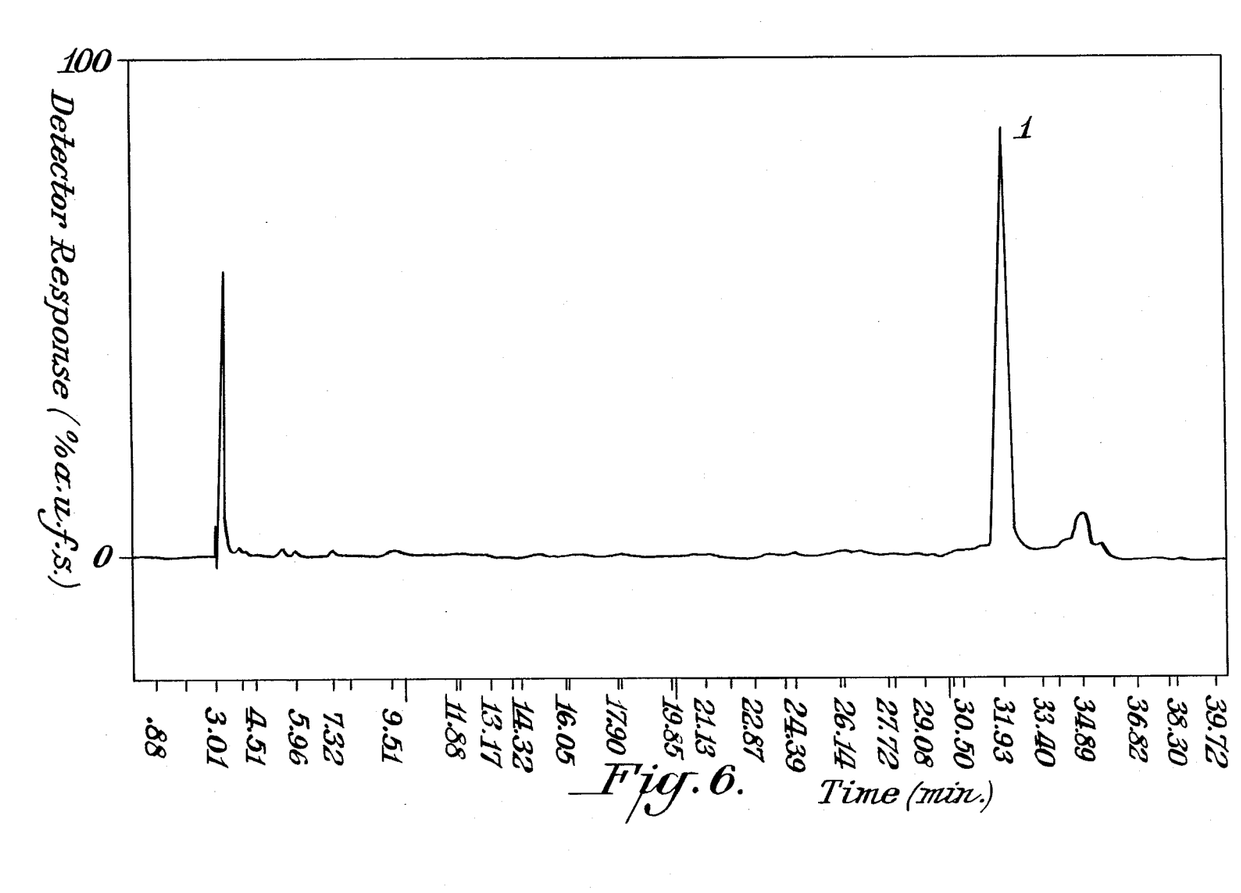
Figure 7:
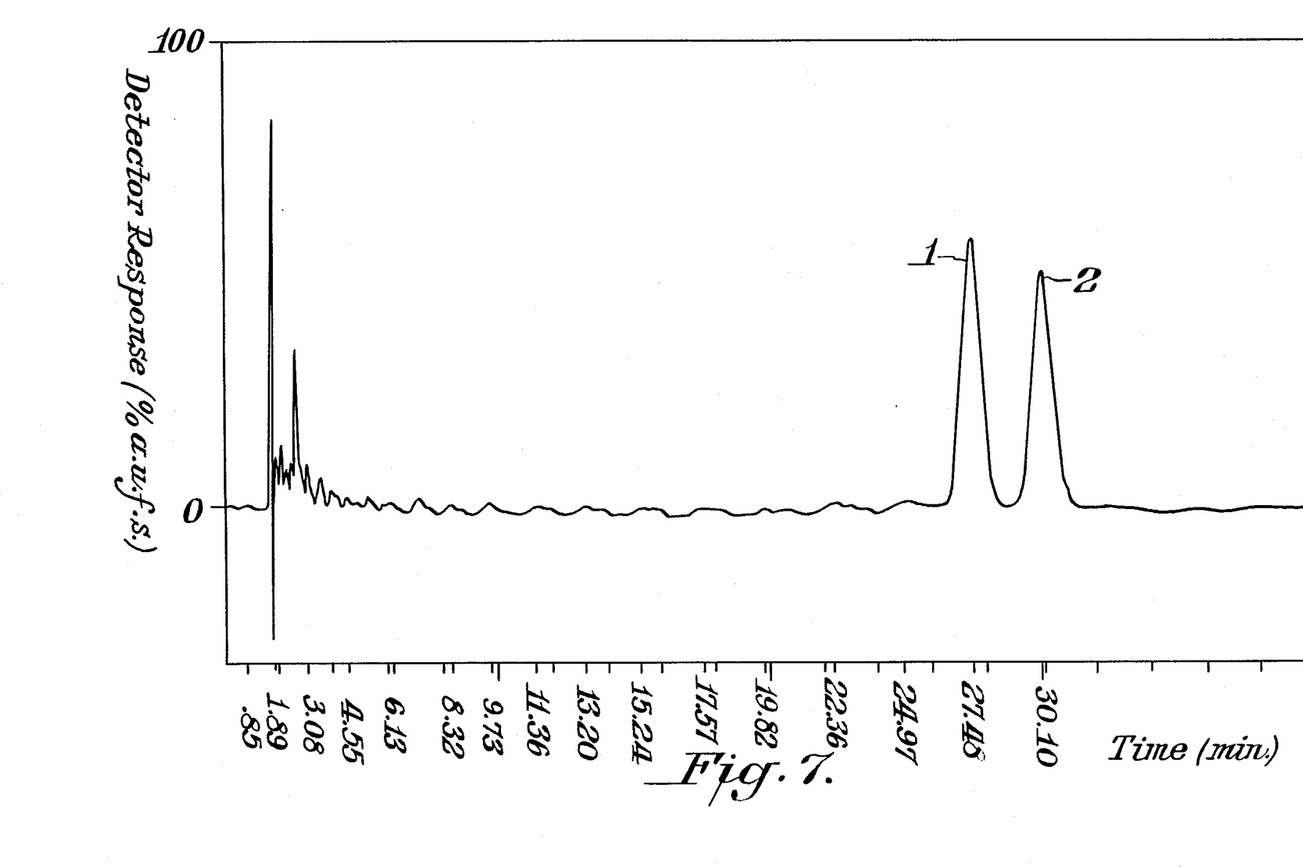
FIGS. 7-11 depict the results of separation accomplished using the packing of this invention on several oligonucleotides synthesized using methylphosphoramidite chemistry.
Figure 8:
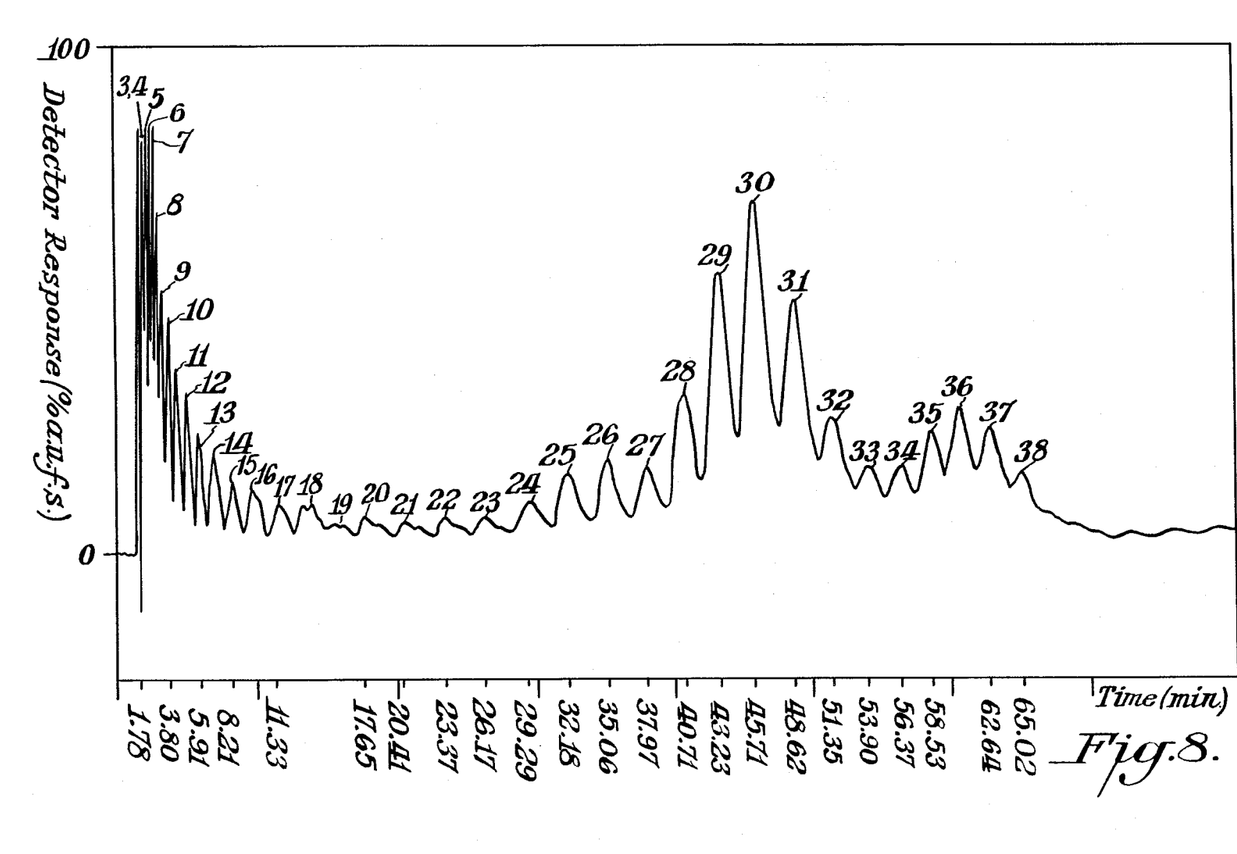
Figure 9:
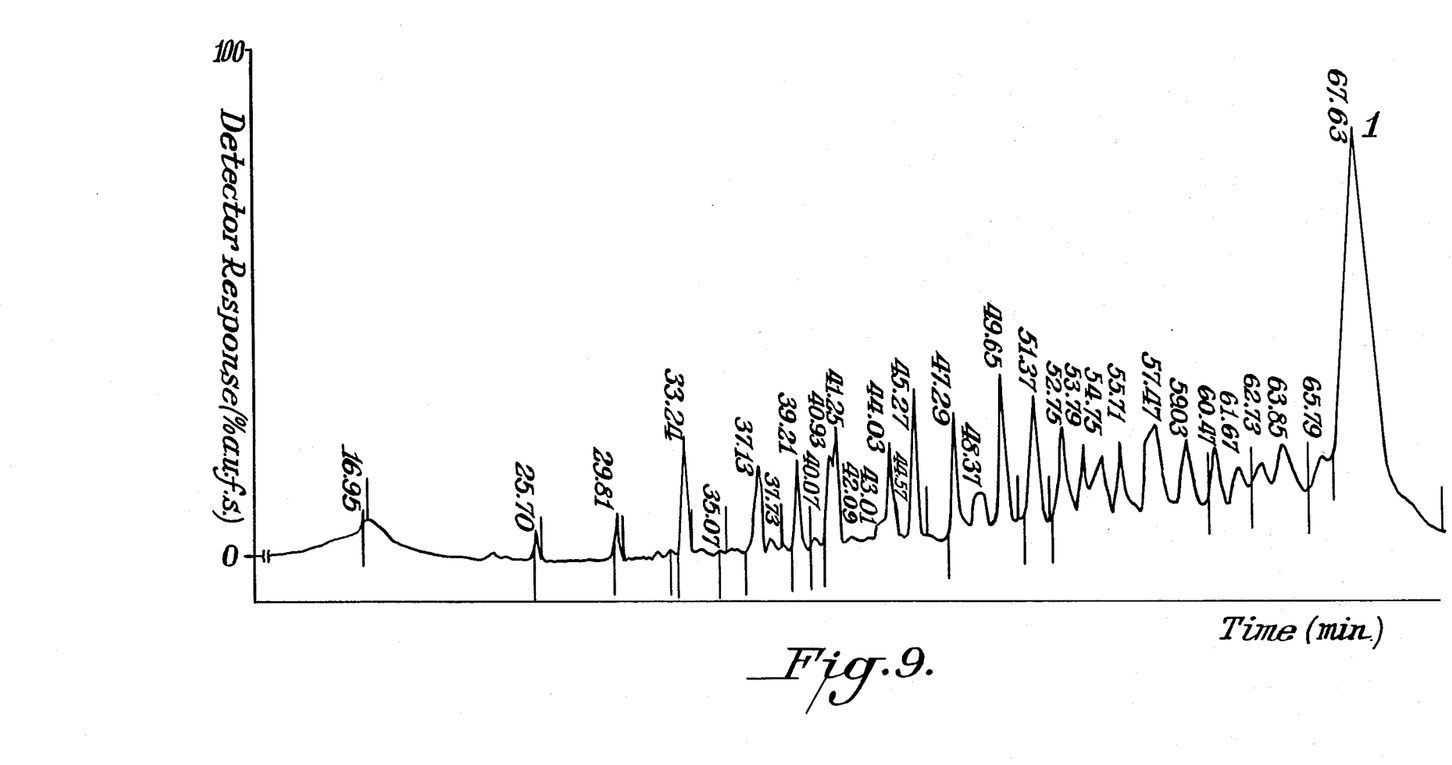
Figures 10, 11:
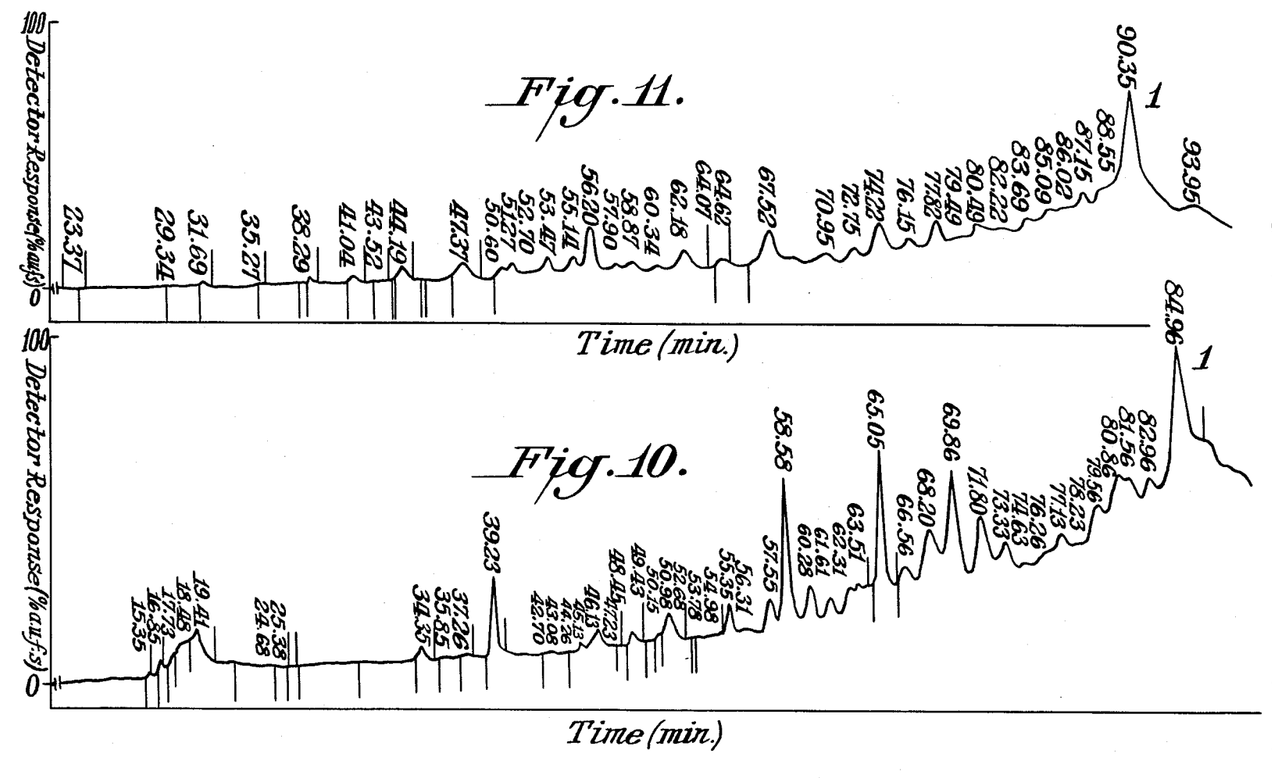

(v) Oligonucleotide:
   AGAACAGCGGTAACGGCTTCATTCAGTCTCTGAAAGACGACCCGT
   (denoted by peak No. 1)
   Gradient: D
   FIG.: 11

D. Analysis of Purified Fractions

Peak fractions were collected from the major peaks of (iii) through (v), and analyzed as in Example 2.D. The oligonucleotides were found to be greater through 90% pure, only a trace of n−1 oligomer being detected.

EXAMPLE 4

Synthesis of Bonded Phase Packing Materials (A) Synthesis of γ-Glycidoxypropylsilica Silica (5 g) was suspended in an aqueous suspension of glycidoxypropyltrimethoxysilane (1 g in 200 mL, pH 6.5) in a flask connected to a vacuum pump. The flask was placed in an ultrasonic bath and was evacuated. After release of pressure the flask was heated to 90° C. for 2 hours with occasional shaking. The product was filtered, washed with distilled water (200 mL), methanol (200 mL) and diethyl ether (200 mL) and was dried under vacuum.

(B) Synthesis of Ligand Bonded Phase Packings

A series of ligand bonded phase packings were synthesized as follows: γ-glycidoxypropylsilica (2.5 g) was suspended in 100 mL of a 1% solution of 3-aminopropanol in tetrahydrofuran. The suspension was heated at reflux for 2 hours. The product was filtered and washed with 500 mL of distilled water and 200 mL of methanol and sucked dry on the filter. The product was suspended in 50 mL of 0.01M hydrochloric acid (pH 3.5) and heated to 75° for about 30 minutes. The final product was filtered; washed with 500 mL of distilled water, 200 mL of methanol and 100 mL of diethyl ether; and dried under vacuum.

This process was repeated with the following ligands: 4-aminobutanol, aminomethane, aminoethane, hydroxylamine, glycine, 2-mercaptoethanol, 2-amino-2-methyl-1,3-propanediol (AMPD), and 2-amino-2-ethyl-1,3-propanediol (AEPD). The AMPD and AEPD derivatized supports could not be synthesized by this method. Supports derivatized with these ligands were successfully prepared according to the procedure of Example 1 by substituting AMPD or AEPD for 2-aminoethanol.

(C) Evaluation of Ligand Bonded Phases

Columns (5 cm×4.6 mm) were packed with each of the above described packing materials using standard slurry techniques. The performance of each was tested by analyzing dA$_{15}$ as described in Example 2.C.i. The results are summarized in the table below:

TABLE

Performance of Ligand Bonded Phases

| No. | Ligand | Resolution of Oligonucleotide dA$_{15}$ |
|---|---|---|
| 1 | 2-Aminoethanol | *** (from Ex. 2.C.i.) |
| 2 | 3-Aminopropanol | ** |
| 3 | 2-amino-2-methyl 1,3 propanediol | ** |
| 4 | 2-amino-2-ethyl 1,3 propanediol | ** |
| 5 | 4-Aminobutanol | * |
| 6 | Aminomethane | * |
| 7 | Aminoethane | * |
| 8 | Hydroxylamine | + |
| 9 | Glycine | + |
| 10 | 2-Mercaptoethanol | + |

***Excellent resolution
**Fair resolution
*Poor resolution
+ Elutes in void volume of column These results indicate that the products of this invention (numbers 1–4, those ligands incorporating a weak anion exchange group in close proximity to a non-ionic polar group) retain oligonucleotides on the column and allow resolution of the oligonucleotides. The poorer resolution obtained with the 4-aminobutanol ligand is believed to be due to the greater distance between the weak anion exchange groups and the polar group. Those ligands not retaining the oligonucleotides are not useful in this application.

EXAMPLE 5

Synthesis of 3(3'-tris(hydroxymethyl)methylamino-2'-hydroxypropoxy)-propylsilylsilica A mixture of toluene (150 mL), N,N-dimethylformamide (50 ml), γ-glycidoxypropyltrimethoxysilane (4 mL) and tris(hydroxymethyl)methylamine (3 g) were stirred for 16 hours at room temperature. The mixture was then heated under reflux for 5 hours. The mixture was cooled and Zorbax® PSM 150 silica (10 g) was added. The mixture was heated under reflux for a further 19 hours. The product was filtered hot and was washed with tetrahydrofuran (THF, 2×200 mL), suspended in THF (200 mL) and brought to reflux. The bonded phase silica was filtered and washed with THF (2×200 mL) and Freon® (2×200 mL).

The bonded phase silica thus prepared was packed into a column 8 cm×6.2 mm, by standard slurry techniques and was evaluated as described in Ex. 2.C.i. The oligonucleotide was retained to a very high degree and resolution was poor. It is believed that the retention could be decreased and the resolution improved by selection of more stringent elution conditions.

EXAMPLE 6

Synthesis and Evaluation of an Alternate 2-Aminoethanol Bonded Phase

Zorbax® GF-250 silica (available from E. I. du Pont de Nemours, Wilmington, DE) (50 g) was suspended in a mixture of tetrahydrofuran (250 mL) and pyridine (25 mL). This mixture was heated to reflux with stirring in a Dean and Stark apparatus. 20 mL of distillate was removed. The mixture was cooled and p-nitrophenylchloroformate (31.4 g) was added. The trap was removed and the mixture heated to reflux overnight. The product was filtered warm and was washed with THF (150 mL) and was slurried in 80% aqueous THF and brought briefly to reflux before filtration. The filter cake was washed with THF (150 mL). The product was resuspended in THF, refluxed for 5 minutes, filtered and washed with THF (2×150 mL) and Freon ® (2×150 mL).

To a suspension of the dried p-nitrophenylformate derivative of the silica (10 g) in THF (250 mL) was added 2-aminoethanol (2 mL). The mixture was heated with stirring under reflux for 2 hours. The product was filtered and was washed with THF (2×200 mL) and Freon ® (2×200 mL) and dried.

The bonded phase packing was loaded into stainless steel tubes (8 cm×6.2 mm) by conventional slurry techniques and was used for the analysis of oligonucleotides using the methods described in Ex. 2.C. These columns gave less retention as well as poorer resolution of the oligonucleotides than the packings prepared via the direct reaction of ethanolamine with glycidoxypropylsilane.

We claim:

1. A packing for chromatographic separations comprising inert support particles with a silane bonded phase wherein the bonded phase contains (a) a weak anion exchange group consisting of either —(NH)— or and at least two polar non-ionic groups each within three backbone chain atoms of the weak anion exchange group, (b) contains hydrophobic regions, and (c) the silane surface coverage of the particle is more than about 0.9 micromole/m2.

2. The packing set forth in claim 1 wherein the support particles include silica, aluminia, and organic polymers.

3. The packing set forth in claim 2 wherein the support particles range in size from about 2 μm to about 30 μm in diameter.

4. The packing set forth in claim 2 wherein the bonded phase has the structure:

5. The packing set forth in claim 3 wherein the bonded phase has the structure:

6. The packing set forth in claim 1 wherein the support particles range in size from about 2 μm to about 30 μm in diameter.

7. The packing of claim 2 wherein the bonded phase has the structure where n is either 2 or 3.

8. The packing of claim 2 wherein the bonded phase has the structure where n=1-2 and X=alkyl or hydroxyalkyl.

9. A method of separating oligonucleotides by the steps of entraining the oligonucleotides in a mobile liquid phase and chromatographically subjecting the oligonucleotides to a packing by passing the mobile phase through the packing, the packing comprising inert support particles with a solid silane bonded phase wherein the bonded phase contains (a) a weak anion exchange group consisting of either —(NH)— or and at least two polar non-ionic groups each within three backbone chain atoms of the weak anion exchange group, (b) contains hydrophobic regions, and (c) the silane surface coverage of the particle is more than about 0.9 micromole/m2, thereby using both reversed-phase and ion-exchange mechanisms to effect the separation.

10. A method as set forth in claim 9 wherein the bonded phase has the structure:

11. A method as set forth in claim 9 wherein the bonded phase has the structure:

where n is either 2 or 3.

12. A method as set forth in claim 9 wherein the mobile phase has a pH from about 4.0 to about 8.5.

13. A method of formulating a chromatographic packing for chromatographically separating oligonucleotides comprising the steps of:

reacting a reactive silane with a modifying reagent containing a weak anion exchange group and a polar non-ionic group, to provide a bonded stationary phase, wherein said stationary phase (a) contains a weak anion exchange group consisting of either —(NH)— or and at least two polar non-ionic groups each within three backbone atoms of the weak anion exchange group and (b) contains hydrophobic regions, and reacting the stationary phase with a support.

14. A method as set forth in claim 13 wherein the modifying reagent is: $NH_2-(CH_2)_n-OH$ where n is either 2 or 3.

15. A method as set forth in claim 14 wherein the reactive silane is γ-glycidoxy propyltrimethoxyl silane and the reagent were n=2 is 2-aminoethanol.

16. A method as set forth in claim 13 wherein the modifying reagent is where n=1-2 and X=alkyl or hydroxyalkyl.